United States Patent
Inoue (10) Patent No.: US 8,511,070 B2
(45) Date of Patent: Aug. 20, 2013

(54) EXHAUST PURIFICATION SYSTEM FOR INTERNAL COMBUSTION ENGINE

(75) Inventor: Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 12/674,784

(22) PCT Filed: Aug. 29, 2008

(86) PCT No.: PCT/JP2008/065560
§ 371 (c)(1),
(2), (4) Date: Feb. 23, 2010

(87) PCT Pub. No.: WO2009/031471
PCT Pub. Date: Mar. 12, 2009

(65) Prior Publication Data
US 2011/0120098 A1    May 26, 2011

(30) Foreign Application Priority Data

Sep. 4, 2007   (JP) .................. 2007-228944

(51) Int. Cl.
*F01N 3/00*   (2006.01)
(52) U.S. Cl.
USPC ............... 60/295; 60/301; 60/285; 60/286
(58) Field of Classification Search
USPC .................. 60/286, 301, 299, 285, 295
See application file for complete search history.

(56) References Cited

U.S. PATENT DOCUMENTS 4,719,751 A * 1/1988 Kume et al. .............. 60/285
6,449,945 B1 9/2002 van Nieuwstadt
(Continued)

FOREIGN PATENT DOCUMENTS

EP   1 176 290 A1   1/2002
EP   1 479 900 A1   11/2004
(Continued)

OTHER PUBLICATIONS

JP 2004-346793 Machine Translated on Nov. 2, 2012.*
(Continued)

*Primary Examiner* — Thomas Denion
*Assistant Examiner* — Patrick Maines
(74) *Attorney, Agent, or Firm* — Oliff & Berridge, PLC.

(57) ABSTRACT

A technique is provided that can complete reduction and release of SOx from a storage-reduction type NOx catalyst in a shorter period of time in a SOx regeneration treatment of bringing an air-fuel ratio and temperature in the storage-reduction type NOx catalyst to a state where the reduction and release of the SOx is possible by alternately executing rich burn in which burning in a cylinder of an internal combustion engine is performed at a rich air-fuel ratio and lean burn in which the burning is performed at a lean air-fuel ratio. By supplying fuel to exhaust gas from a fuel addition valve provided to an exhaust pipe during a lean period in which the lean burn is executed, the temperature of the storage-reduction type NOx catalyst is maintained at a temperature that enables the reduction and release of the SOx. During a rich period in which the rich burn is executed, a rich atmosphere of the storage-reduction type NOx catalyst is achieved to cause the reduction and release of the SOx. Further, the SOx is reduced and released from the storage-reduction type NOx catalyst also during the lean period by achieving a rich air-fuel ratio of the exhaust gas by the fuel addition from the fuel addition valve.

4 Claims, 3 Drawing Sheets

(56) References Cited

U.S. PATENT DOCUMENTS

| | | | |
|---|---|---|---|
| 6,637,189 B1* | 10/2003 | Boegner et al. | 60/274 |
| 2004/0025499 A1 | 2/2004 | Nakatani et al. | |
| 2004/0040287 A1* | 3/2004 | Beutel et al. | 60/285 |
| 2004/0187479 A1 | 9/2004 | Surnilla et al. | |
| 2004/0261401 A1 | 12/2004 | Ohkl et al. | |
| 2005/0109014 A1* | 5/2005 | Hayashi | 60/274 |
| 2005/0217254 A1 | 10/2005 | Uchida et al. | |
| 2009/0077947 A1* | 3/2009 | Nagaoka et al. | 60/284 |
| 2009/0173059 A1* | 7/2009 | Frouvelle et al. | 60/277 |

FOREIGN PATENT DOCUMENTS

| | | |
|---|---|---|
| JP | A 11-050894 | 2/1999 |
| JP | A 2002-155724 | 5/2002 |
| JP | A 2003-120373 | 4/2003 |
| JP | A 2004-068700 | 3/2004 |
| JP | 2004346793 A * | 12/2004 |
| JP | A 2004-360575 | 12/2004 |
| JP | A 2005-291130 | 10/2005 |
| WO | WO 03/033892 A1 | 4/2003 |

OTHER PUBLICATIONS

International Search Report mailed Dec. 2, 2008 for PCT/JP2008/065560.

Extended European Search Report issued in European Application No. 08829855.9 dated May 30, 2011.

* cited by examiner

EXHAUST PURIFICATION SYSTEM FOR INTERNAL COMBUSTION ENGINE

TECHNICAL FIELD

This application is the national phase application under 35 U.S.C. §371 of PCT international application No. PCT/JP2008/065560 filed on Aug. 29, 2008, which claims priority to Japanese patent application No. 2007-228944 filed on Sep. 4, 2007, the contents of which are incorporated herein by reference.

BACKGROUND ART

NOx and other harmful substances are contained in the exhaust gas of an internal combustion engine. It is known that a NOx catalyst for purifying NOx in the exhaust gas may be provided in the exhaust system of the internal combustion engine to reduce discharge of these harmful substances. In this technique, when a storage-reduction type NOx catalyst is provided, the purification performance decreases as the amount of stored NOx increases, and therefore, a reducer is supplied to the storage-reduction type NOx catalyst by performing a rich spike control to reduce and release the NOx stored in the catalyst, for example.

A process of supplying a reducer to achieve a rich atmosphere of the storage-reduction type NOx catalyst in addition to raising the bed temperature of the storage-reduction type NOx catalyst to a temperature that enables SOx to be released is sometimes performed, in order to counteract SOx poisoning in which SOx in the exhaust gas stored in the storage-reduction type NOx catalyst results in a decreased purification performance (hereinafter referred to as a "SOx regeneration treatment"). In the SOx regeneration treatment, the reducer is also used for raising the bed temperature of the storage-reduction type NOx catalyst.

In the case of performing the SOx regeneration treatment, it is necessary to supply the reducer to the storage-reduction type NOx catalyst as described above to achieve the rich atmosphere of the storage-reduction type NOx catalyst with a theoretical air-fuel ratio or less and to raise the temperature of the storage-reduction type NOx catalyst to a sufficiently high temperature for reduction and release of the SOx.

In this case, since both the air-fuel ratio of the exhaust gas introduced to the storage-reduction type NOx catalyst and the temperature of the storage-reduction type NOx catalyst need to be controlled optimally, a technique of alternately performing control of bringing the air-fuel ratio of the exhaust gas to the theoretical air-fuel ratio or a rich state and control of maintaining the temperature of the storage-reduction type NOx catalyst at a high temperature has been developed (for example, see Patent Document 1).

As an example of means of supplying the reducer to the storage-reduction type NOx catalyst, an appropriate combination is known of a technique of a secondary injection in a cylinder of an internal combustion engine and a technique in which an addition valve of the reducer is provided on the upstream of the storage-reduction type NOx catalyst in an exhaust passage and the reducer is added to exhaust gas passing through the exhaust passage (for example, see Patent Document 2 or 3).

One example of the control in the SOx regeneration treatment of the storage-reduction type NOx catalyst is control of alternately executing rich burn performed for burning in a cylinder of an internal combustion engine at a rich air-fuel ratio and lean burn performed for the burning in the cylinder at a lean air-fuel ratio. In this control, fuel supply unit that supplies the fuel to exhaust gas by a method different from an air-fuel ratio control during burning in the cylinder is provided. During a lean period in which the lean burn is executed, the fuel is supplied from the fuel supply unit to the exhaust gas to cause reaction in the storage-reduction type NOx catalyst, and the temperature thereof is maintained at a high temperature that enables the reduction and release of the SOx. During a rich period in which the rich burn is executed, a rich atmosphere of the storage-reduction type NOx catalyst is achieved to cause the reduction and release of the SOx.

Although the temperature of the storage-reduction type NOx catalyst is maintained at the high temperature that enables the reduction and release of the SOx during the lean period with the control described above, it has not been possible to perform the reduction and release of the SOx since the air-fuel ratio of the exhaust gas introduced to the catalyst is the lean air-fuel ratio. That is, the reduction and release of the SOx have not been performed during the lean period, and the reduction and release of the SOx have been performed only during the rich period. Thus, treatment time of the SOx regeneration treatment of the storage-reduction type NOx catalyst increases, and there has been a problem of deterioration of fuel efficiency or thermal degradation of the catalyst.

Patent Document 1: Japanese Patent Application Publication No. JP-A-2004-068700
Patent Document 2: Japanese Patent Application Publication No. JP-A-2003-120373
Patent Document 3: Japanese Patent Application Publication No. JP-A-2002-155724

DISCLOSURE OF THE INVENTION

Problem to be Solved by the Invention

An object of the present invention is to provide a technique with which the reduction and release of SOx from a storage-reduction type NOx catalyst can be completed in a shorter period of time in a SOx regeneration treatment, in which rich burn performed for burning in a cylinder of an internal combustion engine at a rich air-fuel ratio and lean burn performed for the burning in the cylinder at a lean air-fuel ratio are alternately executed so as to bring an air-fuel ratio and temperature in the storage-reduction type NOx catalyst to a state where the reduction and release of the SOx is possible.

Means for Solving the Problem

The present invention for achieving the object described above is intended for an exhaust purification system that performs the SOx regeneration treatment of the storage-reduction type NOx catalyst (hereinafter also simply referred to as "NOx catalyst") by alternately executing the rich burn and the lean burn in the cylinder of the internal combustion engine and that includes fuel supply unit that supplies fuel to the exhaust gas with a method different from the air-fuel ratio control during burning in the cylinder. The fuel is supplied to the exhaust gas from the fuel supply unit to maintain the temperature of the NOx catalyst at the temperature that enables the reduction and release of SOx during a lean period in which the lean burn is executed, and the SOx is reduced and released in a rich atmosphere of the NOx catalyst during a rich period in which the rich burn is executed. Further, the most significant feature of the present invention is that the SOx is reduced and released by bringing the air-fuel ratio of the exhaust gas to a theoretical air-fuel ratio or a lower rich air-fuel ratio with the fuel supply from the fuel supply unit even during the lean period.

More specifically, an exhaust purification system for an internal combustion engine includes: a storage-reduction type NOx catalyst that is provided in an exhaust passage through which exhaust gas from an internal combustion engine passes and that purifies NOx in the exhaust gas; rich burn unit that executes rich burn in which an air-fuel ratio during burning in a cylinder of the internal combustion engine is a rich air-fuel ratio; lean burn unit that executes lean burn in which the air-fuel ratio during burning in the cylinder of the internal combustion engine is a lean air-fuel ratio; and fuel supply unit that supplies fuel into the exhaust gas aside from fuel for the burning in the cylinder. In the exhaust purification system for an internal combustion engine, the rich burn by the rich burn unit and the lean burn by the lean burn unit are executed alternately, when a SOx regeneration treatment of the storage-reduction type NOx catalyst is executed, such that a rich atmosphere of the storage-reduction type NOx catalyst that enables release and reduction of SOx is achieved during a rich period in which the rich burn is executed and a temperature of the storage-reduction type NOx catalyst is maintained at a temperature that enables the release and reduction of the SOx by supplying the fuel into the exhaust gas with the fuel supply unit during a lean period in which the lean burn is executed. The exhaust purification system for an internal combustion engine is characterized in that the rich atmosphere of the storage-reduction type NOx catalyst that enables the release and reduction of the SOx is achieved even during the lean period by the fuel supplied into the exhaust gas by the fuel supply unit.

In the SOx regeneration treatment with respect to the NOx catalyst, it is necessary to raise the temperature of the NOx catalyst to the temperature that enables the release and reduction of the SOx and to achieve the rich atmosphere of the NOx catalyst. In a technique serving as a basis for the present invention, the rich period in which the rich burn is performed in the cylinder of the internal combustion engine and the lean period in which the lean burn is performed in the cylinder are provided alternately, and the fuel is further supplied separately to the exhaust gas by the fuel supply unit in the lean period.

That is, the catalyst temperature is raised and the high temperature that enables the reduction and release of the SOx is maintained by the fuel supplied to the NOx catalyst during the lean period, and the SOx is reduced and released by achieving the rich atmosphere of the NOx catalyst in the rich period.

In this manner, in the technique serving as a basis for the present invention, the lean period is a period for maintaining the NOx catalyst at the sufficiently high temperature, and the reduction and release of the SOx has not been performed during this period. Meanwhile, since the temperature of the NOx catalyst tends to rather decrease in the rich period in which the SOx is actually reduced and released, it has been difficult to set a long rich period without limitations. This has been a hindrance in shortening the time for completing the reduction and release of the SOx in the SOx regeneration treatment, and there has been a possibility of causing deterioration of fuel efficiency for the SOx regeneration treatment or thermal degradation of the NOx catalyst.

Thus, in the present invention, in addition to supplying the fuel to the exhaust gas with the fuel supply unit during the lean period to raise the temperature of the NOx catalyst, the air-fuel ratio of the exhaust gas is caused to be the rich air-fuel ratio to achieve the rich atmosphere of the NOx catalyst by the supplied fuel.

Accordingly, the rich atmosphere of the NOx catalyst can be achieved in both the rich period and the lean period to enable the reduction and release of the SOx. Thus, the time for completing the reduction and release of the SOx in the SOx regeneration treatment can be shortened. As a result, the fuel efficiency for the SOx regeneration treatment can be improved, and the thermal degradation of the NOx catalyst can be suppressed. Note that, in the present invention, it is needless to say that the rich period and the lean period may be the same length or different lengths.

Also, in the present invention, the fuel supply unit may be a fuel addition valve that is provided on an upstream side of the NOx catalyst in the exhaust passage and that adds the fuel to the exhaust gas passing through the exhaust passage.

Aside from the provided fuel addition valve, examples of means of supplying the fuel to the exhaust gas during the lean period include secondary injection unit that performs a secondary injection besides a main injection in the cylinder. However, in the case of supplying the fuel to the exhaust gas with the secondary injection unit, the fuel amount injected in the cylinder increases, and therefore there is a possibility of a so-called oil dilution occurring on a wall surface in the cylinder. In the case where the internal combustion engine includes an exhaust gas recirculation (EGR) device, there is also a possibility that the fuel injected secondarily by the secondary injection unit enters an EGR passage to cause degradation of respective parts forming the EGR device.

In contrast, in the case of supplying the fuel to the exhaust gas with fuel addition valve provided in the exhaust passage, the temperature of the NOx catalyst can be maintained at the high temperature and the rich atmosphere of the NOx catalyst can be achieved during the lean period without such inconveniences.

Also, in the present invention, a length of the lean period may be determined based on an amount of heat necessary for maintaining the temperature of the NOx catalyst at the temperature that enables the reduction and release of the SOx.

That is, since the fuel is supplied into the exhaust gas from the fuel supply unit during the lean period, the temperature of the NOx catalyst can be further increased as the lean period increases. Thus, when the lean period is too long and the temperature of the NOx catalyst becomes excessively high, there is a possibility of a thermal degradation or melting damage of the NOx catalyst occurring. On the other hand, when the lean period is too short, raising the temperature of the NOx catalyst to the temperature that enables the reduction and release of the SOx may be difficult. Further, in the present invention, the rich atmosphere of the NOx catalyst is achieved by supplying the fuel into the exhaust gas from the fuel supply unit. That is, in the present invention, the degree of freedom with respect to the fuel addition amount (supply rate) during the lean period is not necessarily high since the fuel supplied from the fuel supply unit is also used for the control of the air-fuel ratio of the exhaust gas.

Thus, in the present invention, the length of the lean period is determined based on the amount of heat necessary for maintaining the temperature of the NOx catalyst at the temperature that enables the reduction and release of the SOx. Thus, it is possible to maintain the temperature of the NOx catalyst at a temperature appropriate for the reduction and release of the SOx within a range of not causing the thermal degradation or melting damage.

Note that means for solving the problem in the present invention may be used in any possible combination.

Effect of the Invention

With the present invention, reduction and release of SOx from a storage-reduction type NOx catalyst can be completed in a shorter period of time in a SOx regeneration treatment of bringing an air-fuel ratio and temperature in the storage-reduction type NOx catalyst to a state where the reduction and release of the SOx is possible by alternately executing rich burn in which burning in a cylinder of an internal combustion engine is performed at a rich air-fuel ratio and lean burn in which the burning in the cylinder is performed at a lean air-fuel ratio.

DESCRIPTION OF THE REFERENCE NUMERALS 1 internal combustion engine
2 cylinder
3 fuel injection valve
8 intake manifold
9 intake pipe
10 NSR
14 fuel addition valve
15 centrifugal turbocharger
15a compressor housing
15b turbine housing
18 exhaust manifold
19 exhaust pipe
35 ECU

BEST MODES FOR CARRYING OUT THE INVENTION

Hereinafter, best modes for carrying out the present invention will be explained in detail using examples with reference to the drawings.

First Embodiment

Figure 1:
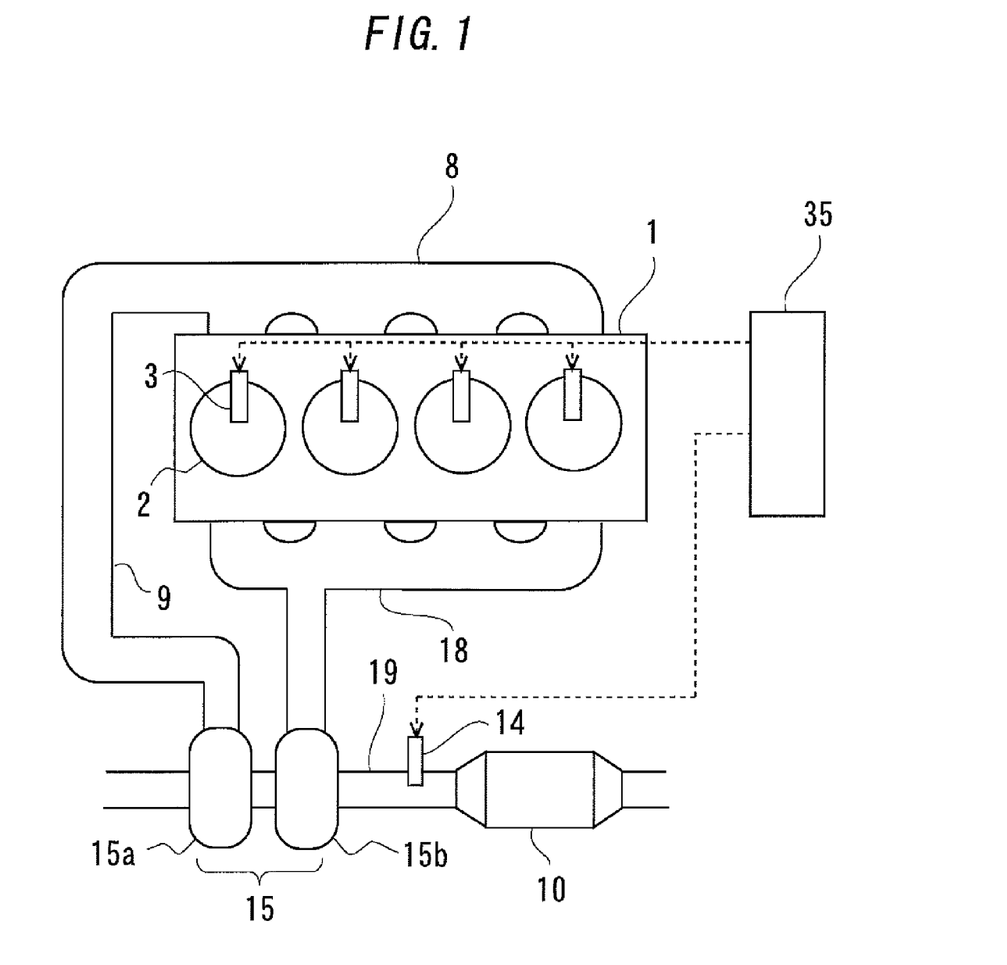
FIG. 1 is a view showing a schematic configuration of an internal combustion engine according to an embodiment of the present invention and an exhaust system and a control system thereof.

FIG. 1 is a view showing a schematic configuration of an internal combustion engine according to this embodiment. An internal combustion engine 1 shown in FIG. 1 is a diesel engine including four cylinders 2. Each cylinder 2 is provided with a fuel injection valve 3 for injecting fuel in the cylinder.

An intake manifold 8 is connected to the internal combustion engine 1, and the upstream side of the intake manifold 8 is connected with an intake pipe 9. Further, the intake pipe 9 is connected to a compressor housing 15a of a centrifugal turbocharger 15. An exhaust manifold 18 is connected to the internal combustion engine 1, and the exhaust manifold 18 is connected with a turbine housing 15b of the centrifugal turbocharger 15. The turbine housing 15b is connected with an exhaust pipe 19. The exhaust pipe 19 is connected to a muffler (not shown) on the downstream thereof.

In the exhaust pipe 19, an NSR 10 is provided as a storage-reduction type NOx catalyst that stores (absorbs or adsorbs) NOx in exhaust gas when the oxygen concentration in the exhaust gas is high and releases and reduces the stored NOx when the oxygen concentration in the exhaust gas decreases and a reducer exists. On the upstream side of the NSR 10 in the exhaust pipe 19, a fuel addition valve 14 that supplies fuel to the NSR 10 by adding the fuel as the reducer to the exhaust gas passing through the exhaust pipe 19 is provided.

To the internal combustion engine 1 configured as described above, an electronic control unit (ECU) 35 for controlling the internal combustion engine 1 is attached. The ECU 35 is a unit that controls an operation state or the like of the internal combustion engine 1 in accordance with an operation condition of the internal combustion engine 1 or a request of a driver. The ECU 35 also performs control relating to the NSR 10.

Sensors such as an air flow meter, an accelerator position sensor, a crank position sensor, or the like (not shown) are connected to the ECU 35 via an electrical wiring such that output signals thereof are input to the ECU 35. The fuel injection valve 3, the fuel addition valve 14, and the like are connected to the ECU 35 via an electrical wiring so as to be controlled by the ECU 35.

The ECU 35 includes a CPU, a ROM, a RAM, and the like. The ROM stores programs for performing various controls of the internal combustion engine 1 and maps storing data. A SOx regeneration treatment routine of the present invention described below is also one of the programs stored in the ROM in the ECU 35.

Next, using FIG. 2, control of a SOx regeneration treatment of the NSR 10 of this embodiment will be described. In this embodiment, rich burn in which an air-fuel ratio during burning in the cylinder 2 is a rich air-fuel ratio and lean burn in which the air-fuel ratio during burning is a lean air-fuel ratio are executed alternately for predetermined periods. That is, in this embodiment, a rich period and a lean period form one cycle of the control, and the cycle formed of the rich period and the lean period is repeated periodically. In this embodiment, the rich period in which the rich burn is executed is set to be shorter than the lean period in which the lean burn is executed.

In this case, in the rich period, the temperature of exhaust gas introduced to the NSR 10 increases after a slight time delay since an intake air amount is reduced in order to reduce the air-fuel ratio. When it is switched to the lean period, the temperature of the exhaust gas introduced to the NSR 10 decreases after a slight time delay since the intake air amount increases.

Figure 2:
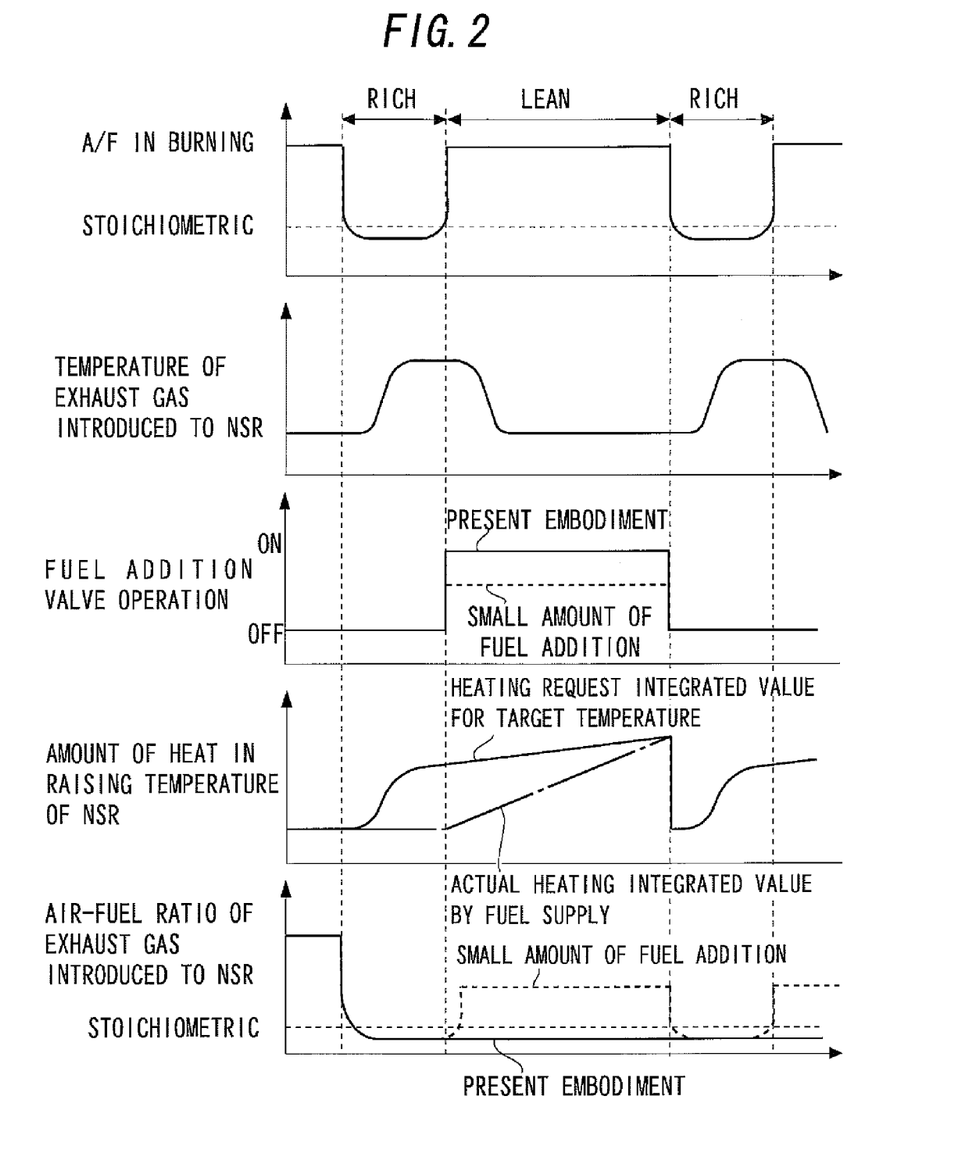
FIG. 2 is a graph showing changes of respective parameters in a SOx regeneration treatment according to the embodiment of the present invention.

As shown in the third graph from the top in FIG. 2, the fuel as the reducer is added into the exhaust gas from the fuel addition valve 14 in this embodiment in the case where it is switched to the lean period and the air-fuel ratio during burning in the cylinder 2 has become the lean air-fuel ratio. Accordingly, the fuel can be supplied to the NSR 10 to cause reaction with oxygen, and the temperature of the NSR 10 can be raised to a temperature necessary for the SOx regeneration treatment.

The fourth graph from the top in FIG. 2 shows an integrated value of a request heating value in the NSR 10 for maintaining the temperature of the NSR 10 during the SOx regeneration treatment at the high temperature necessary for reduction and release of SOx and an integrated value of an actual heating value in the NSR 10 due to the fuel addition from the fuel addition valve 14.

As shown in the fourth graph from the top in FIG. 2, the integrated value of the request heating value rapidly increases immediately after the air-fuel ratio during burning is switched to the rich air-fuel ratio, and then the integrated value of the request heating value further increases moderately until the lean period ends. When it is switched to the rich period in the next cycle, the integrated value of the request heating value is temporarily reset, and a new integration of the request heating value is started.

In contrast, the integrated value of the actual heating value in the NSR 10 starts to increase after the fuel addition from the fuel addition valve 14 is started, and then continues to increase. At the point in time when the integrated value of the actual heating value in the NSR 10 has become equivalent to the integrated value of the request heating value, the lean period ends, and it is switched to the rich period of the next cycle.

That is, one cycle of an air-fuel control of the burning ends at the point in time when a heating value equal to a heating value necessary for maintaining the temperature of the NSR 10 during the SOx regeneration treatment at the high temperature necessary for the reduction and release of the SOx has been actually obtained, and this cycle is repeated. Accordingly, the temperature of the NSR 10 can be reliably maintained at the high temperature necessary for the reduction and release of the SOx.

In this embodiment, the amount of the fuel added from the fuel addition valve 14 during the lean period is an amount that causes the exhaust gas introduced to the NSR 10 during the lean period to have the rich air-fuel ratio lower than a stoichiometric air-fuel ratio.

That is, even in the case where the fuel is added to the exhaust gas from the fuel addition valve 14 during the lean period, the exhaust gas introduced to the NSR 10 is brought to a state where the air-fuel ratio is higher than the stoichiometric air-fuel ratio during the lean period as shown by a dotted line in the lowermost graph in FIG. 2, if the fuel addition amount is small as shown by a dotted line in the third graph from the top in FIG. 2. In this case, only temperature maintenance of the NSR 10 is performed in the lean period and the reduction and release of the SOx are not performed. Thus, since the SOx in the NSR 10 is reduced and released only during the rich period in the SOx regeneration treatment, there has been a possibility of a period until the completion of the SOx regeneration treatment lengthening to cause deterioration of fuel efficiency for the SOx regeneration treatment or thermal degradation of the NSR 10.

In contrast, in this embodiment, the air-fuel ratio of the exhaust gas introduced to the NSR 10 is brought to the rich air-fuel ratio by adding the fuel to the exhaust gas with the fuel addition valve 14 also during the lean period, as shown by solid lines in the third graph from the top and the lowermost graph in FIG. 2. Thus, the SOx stored in the NSR 10 can be released and reduced also during the lean period. As a result, a period of the SOx regeneration treatment can be shortened, and the deterioration of the fuel efficiency for the SOx regeneration treatment or the thermal degradation of the NSR 10 can be suppressed.

Figure 3:
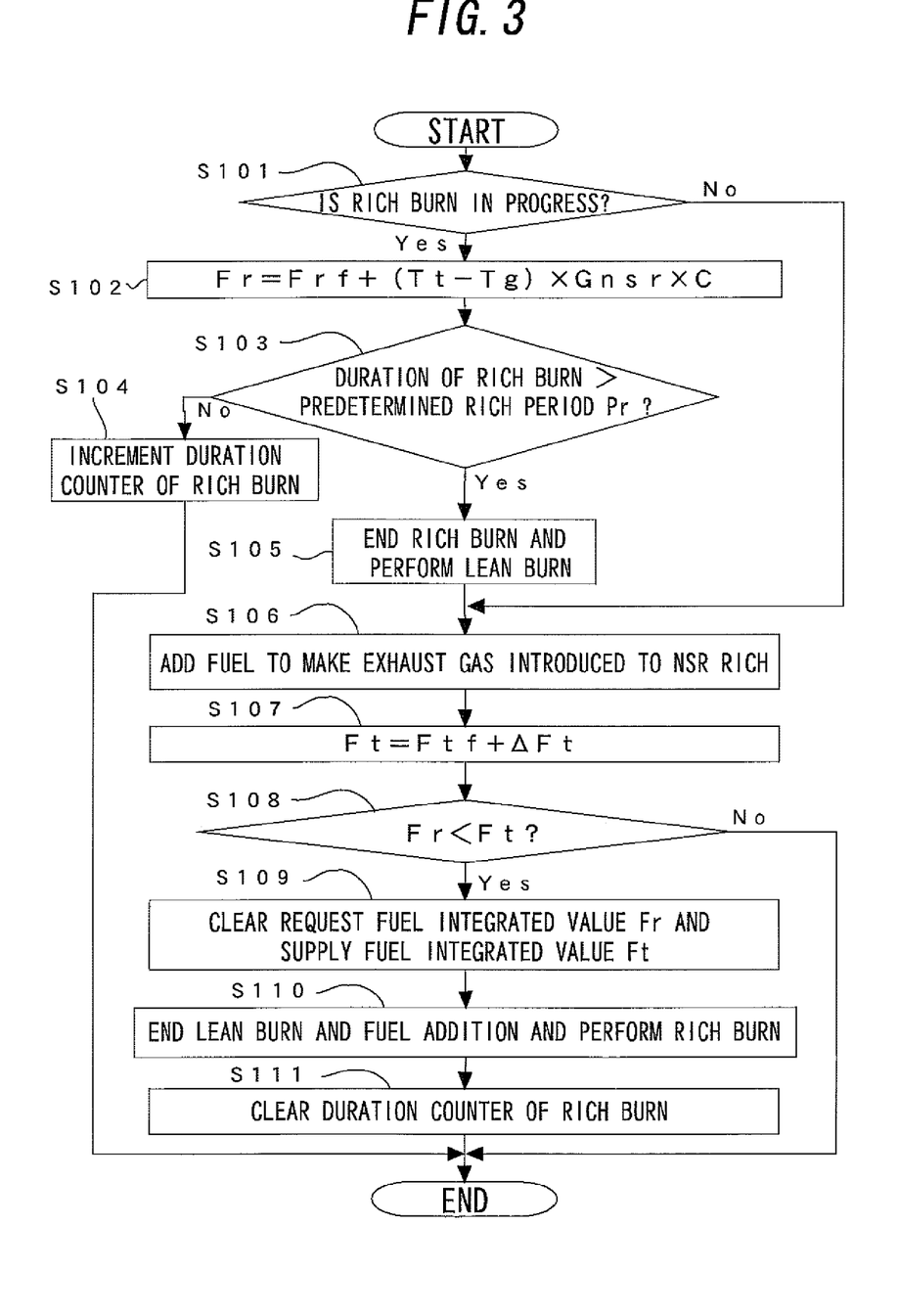
FIG. 3 is a flowchart showing a SOx regeneration treatment routine according to the embodiment of the present invention.

FIG. 3 shows the SOx regeneration treatment routine of this embodiment. The routine is a program stored in the ROM of the ECU 35, and is a routine executed repeatedly by the ECU 35 every predetermined period during an ON-period of a SOx regeneration treatment flag that is turned on in the case where the SOx regeneration treatment is determined to be necessary.

When the routine is executed, whether the rich burn is in progress is first determined in S101. Specifically, it may be determined by reading a value of a rich burn flag that is turned on while the rich burn is in progress, or it may be determined from an instruction value from the ECU 35 to the fuel injection valve 3. In the case where the rich burn is determined to be not in progress, the process proceeds to S106. On the other hand, in the case where the rich burn is determined to be in progress, the process proceeds to S102.

In S102, the integrated value of the heating value requested (request heating value integrated value) for maintaining the NSR 10 at the temperature that enables the SOx regeneration treatment is calculated at this point. More specifically, a request fuel integrated value Fr (g) necessary for maintaining the NSR 10 at the temperature that enables the SOx regeneration treatment for one cycle formed of the rich period and the lean period in the SOx regeneration treatment is calculated by the following formula.

$$Fr = Frf + (Tt - Tg) \times Gnsr \times C \tag{1}$$

Herein, a value of the request fuel integrated value Fr (g) obtained when S102 of the last routine has been executed is represented as Frf (g). A target temperature of the NSR 10 in the SOx regeneration treatment is represented as Tt (° C.). A temperature of the exhaust gas introduced to the NSR 10 at the point of execution of S102 is represented as Tg (° C.). A flow rate of the exhaust gas introduced to the NSR 10 is represented as Gnsr (g). A bed temperature reaction coefficient is represented as C (g/g° C.) as the amount of fuel necessary for increasing the temperature of 1 g of the exhaust gas by 1° C. That is, in this embodiment, the integrated value of the heating value necessary for maintaining the NSR 10 at the temperature that enables the SOx regeneration treatment is substituted by the integrated value of the fuel amount requested at the time. When the process of S102 ends, the process proceeds to S103.

In S103, whether duration of this rich burn is longer than a predetermined rich period Pr determined in advance is determined. The duration of the rich burn is an actual elapsed time from the start of this rich burn up to this point. The predetermined rich period Pr is a period determined by an experiment in advance as a period for which the rich burn is to be continued. Since the temperature of the NSR 10 (not the temperature of the exhaust gas introduced to the NSR 10) tends to rather decrease during the rich burn in the SOx regeneration treatment, the predetermined rich period Pr is determined from the viewpoint of efficiency in maintaining the temperature of the NSR 10.

In the case where the duration of the rich burn is determined to be less than or equal to the predetermined rich period Pr, it is judged that the rich burn should not be ended yet, and therefore the process proceeds to S104. On the other hand, in the case where the duration of the rich burn is determined to have exceeded the predetermined rich period Pr, it is judged that the rich burn should be ended, and therefore the process proceeds to S105.

In S104, while the rich burn is continued, a counter of the duration of the rich burn is incremented and the routine is temporarily ended. In S105, the rich burn is ended to shift to the lean burn. When the process of S105 ends, the process proceeds to S106.

In S106, the fuel addition from the fuel addition valve 14 to the exhaust gas passing through the exhaust pipe 19 is started. At this time, the fuel addition amount is determined such that the air-fuel ratio of the exhaust gas introduced to the NSR 10 becomes the rich air-fuel ratio lower than the theoretical air-fuel ratio. When the process of S106 ends, the process proceeds to S107.

In S107, the integrated value of the actual heating value of the NSR 10 is calculated. Specifically, a supply fuel integrated value Ft (g) introduced to the NSR 10 is calculated by the following formula.

$$Ft = Ftf + \Delta Ft \tag{2}$$

Herein, a value of the supply fuel integrated value Ft introduced to the NSR 10 that is obtained when S107 of the last routine has been executed is represented as Ftf (g). The amount of the fuel added from the fuel addition valve 14 from the time of the last execution of the treatment until the time of this execution of the treatment is represented as ΔFt (g). When the process of S107 ends, the process proceeds to S108.

In S108, whether the supply fuel integrated value Ft has exceeded the request fuel integrated value Fr is determined. In the case where the supply fuel integrated value Ft is determined to be less than or equal to the request fuel integrated value Fr, the routine is temporarily ended in that state. On the other hand, in the case where the supply fuel integrated value Ft is determined to have exceeded the request fuel integrated value Fr, the process proceeds to S109.

In S109, the values of the request fuel integrated value Fr and the supply fuel integrated value Ft are cleared. When the process of S109 ends, the process proceeds to S110.

In S110, the lean burn and the fuel addition from the fuel addition valve 14 are ended, and the rich burn is started. When the process of S110 ends, the process proceeds to S111.

In S111, a duration counter of the rich burn is cleared. When the process of S111 ends, the routine is temporarily ended.

As described above, in this embodiment, the rich burn in which the air-fuel ratio during burning in the cylinder 2 of the internal combustion engine 1 is the rich air-fuel ratio and the lean burn in which the air-fuel ratio during burning in the cylinder 2 is the lean air-fuel ratio are executed repeatedly, and the temperature of the NSR 10 is maintained at the temperature that enables the reduction and release of the SOx by performing the fuel addition to the exhaust gas during the lean period in which the lean burn is executed. Since the air-fuel ratio of the exhaust gas introduced to the NSR 10 also becomes the rich air-fuel ratio during the rich period in which the rich burn is executed, the SOx stored in the NSR 10 can be reduced and released during the rich period.

Further, in this embodiment, the fuel amount added to the exhaust gas during the lean period is optimized so that the air-fuel ratio of the exhaust gas introduced to the NSR 10 becomes the rich air-fuel ratio not only during the rich period in which the rich burn is executed but also during the lean period. Accordingly, the SOx can be reduced and released during both the lean period and the rich period. As a result, the treatment time of the SOx regeneration treatment can be shortened, and deterioration of the fuel efficiency for the SOx regeneration treatment or thermal degradation of the NSR 10 can be suppressed.

In this embodiment, the fuel addition valve 14 provided to the exhaust pipe 19 is employed as means of supplying the fuel into the exhaust gas during the lean period. Accordingly, for example, inconveniences can be suppressed such as oil in the cylinder 2 being diluted or the fuel entering an EGR passage (not shown) when the fuel is supplied to the NSR 10, as in the case where a secondary injection in the cylinder 2 of the internal combustion engine 1 is employed.

Note that, for example, even in the case where the secondary injection in the cylinder 2 of the internal combustion engine 1 is employed as the means of supplying the fuel into the exhaust gas during the lean period, it is possible to sufficiently obtain the most significant advantageous effects of the present invention that the treatment time of the SOx regeneration treatment can be shortened and that deterioration of the fuel efficiency for the SOx regeneration treatment or thermal degradation of the NSR 10 can be suppressed.

In this embodiment, an ending time of the lean period is when the integrated value of the heating value generated in the NSR 10 (integrated value Ft of the fuel amount supplied to the NSR 10) has exceeded the request heating value integrated value (request fuel integrated value Fr). Therefore, the lean period can be a period sufficient for maintaining the temperature of the NSR 10 at the temperature that enables the reduction and release of the SOx. Accordingly, the temperature of the NSR 10 can be maintained at the temperature that enables the reduction and release of the SOx more reliably with simple control.

In the SOx regeneration treatment routine, the amount of heat necessary for maintaining the temperature of the NSR 10 at the temperature that enables the reduction and release of the SOx is substituted with the necessary fuel amount, the amount of heat for the actual heat generation in the NSR 10 is substituted with the fuel amount supplied to the NSR 10, and the ending time of the lean period is judged by comparing the two. However, the substitutions are one example of carrying out the present invention. The amount of heat necessary for maintaining the temperature of the NSR 10 at the temperature that enables the reduction and release of the SOx and the amount of heat for the actual heat generation in the NSR 10 may be obtained by another method.

Also, in the present invention, the relations between the length of the lean period, the temperature of the NSR 10 (temperature of the exhaust gas introduced to the NSR 10), and the operation state of the internal combustion engine 1 may be mapped in advance. The ending time of the lean period may be determined by reading the length of the lean period corresponding to the temperature of the NSR 10 during the execution of the SOx regeneration treatment and a detected value of the operation state of the internal combustion engine 1 from the map. Even if the ending time of the lean period is determined with this method, it is possible to sufficiently obtain the most significant advantageous effects of the present invention that the treatment time of the SOx regeneration treatment can be shortened and that deterioration of the fuel efficiency for the SOx regeneration treatment or thermal degradation of the NSR 10 can be suppressed.

Note that, in the SOx regeneration treatment routine, the ECU 35 that executes the process of S110 corresponds to rich burn unit. The ECU 35 that executes the process of S105 corresponds to lean burn unit. The fuel addition valve 14 constitutes fuel supply unit.

In the embodiment described above, an example in which the present invention is applied to a diesel engine has been described. However, the present invention may be applied to an internal combustion engine with another combustion system such as a gasoline engine. In the embodiment described above, the air-fuel ratio of the exhaust gas introduced to the NSR 10 is brought to the rich air-fuel ratio both during the rich period and during the lean period by adding the fuel from the fuel addition valve 14 during the lean period. However, the air-fuel ratio of the exhaust gas introduced to the NSR 10 during the lean period and the rich period may be the theoretical air-fuel ratio.

The invention claimed is:

1. An exhaust purification system for an internal combustion engine, the exhaust purification system comprising:
an exhaust passage;
a storage-reduction NOx catalyst that is provided in the exhaust passage through which exhaust gas from the internal combustion engine passes and that purifies NOx in the exhaust gas;
a fuel addition valve that supplies fuel into the exhaust gas aside from the fuel for burning in a cylinder of the internal combustion engine; and an electronic control unit that includes control logic, which when executed:
executes a rich burn in which an air-fuel ratio during burning in the cylinder of the internal combustion engine is a rich air-fuel ratio; and
executes a lean burn in which the air-fuel ratio during burning in the cylinder of the internal combustion engine is a lean air-fuel ratio, wherein:
the rich burn and the lean burn are executed alternately, when a SOx regeneration treatment of the storage-reduction NOx catalyst is executed, such that a rich atmosphere of the storage-reduction NOx catalyst that enables release and reduction of SOx is achieved during a rich period in which the rich burn is executed and a temperature of the storage-reduction NOx catalyst, during the rich period and a lean period in which the lean burn is executed, is maintained at a temperature that enables the release and reduction of the SOx by supplying the fuel into the exhaust gas with the fuel addition valve during the lean period and
the rich atmosphere of the storage-reduction NOx catalyst that enables the release and reduction of the SOx is also maintained during the lean period by the fuel supplied into the exhaust gas by the fuel addition valve.

2. The exhaust purification system for the internal combustion engine according to claim 1, wherein the fuel addition valve is provided on an upstream side of the storage-reduction NOx catalyst in the exhaust passage and adds the fuel to the exhaust gas passing through the exhaust passage.

3. The exhaust purification system for the internal combustion engine according to claim 2, wherein a length of the lean period is determined based on an amount of heat necessary for maintaining the temperature of the storage-reduction NOx catalyst at the temperature that enables the reduction and release of the SOx.

4. The exhaust purification system for the internal combustion engine according to claim 1, wherein a length of the lean period is determined based on an amount of heat necessary for maintaining the temperature of the storage-reduction NOx catalyst at the temperature that enables the reduction and release of the SOx.

* * * * *